(12) United States Patent
Adas et al.

(10) Patent No.: US 7,361,010 B2
(45) Date of Patent: Apr. 22, 2008

(54) APPARATUS FOR INJECTION MOLDING

(75) Inventors: James Oliver Adas, Clinton Township, MI (US); Craig Vincent Kovacic, Imlay City, MI (US)

(73) Assignee: D-M-E Company, Madison Heights, MI (US)

( * ) Notice: Subject to any disclaimer, the term of this patent is extended or adjusted under 35 U.S.C. 154(b) by 221 days.

(21) Appl. No.: 11/340,191

(22) Filed: Jan. 26, 2006

(65) Prior Publication Data

US 2007/0172538 A1    Jul. 26, 2007

(51) Int. Cl.
*B29C 45/20* (2006.01)

(52) U.S. Cl. ........................................ 425/549

(58) Field of Classification Search ................ 425/549, 425/567, 568, 542
See application file for complete search history.

(56) References Cited

U.S. PATENT DOCUMENTS

| | | | |
|---|---|---|---|
| 4,832,593 A | 5/1989 | Brown | |
| 5,554,395 A | 9/1996 | Hume et al. | |
| 5,795,599 A | 8/1998 | Gellert | |
| 5,820,899 A | 10/1998 | Gellert et al. | |
| 5,980,237 A | 11/1999 | Swenson et al. | |
| 6,302,680 B1 | 10/2001 | Gellert et al. | |
| 6,821,112 B2 | 11/2004 | Eigler et al. | |
| 6,869,276 B2 | 3/2005 | Babin et al. | |
| 7,168,943 B2 * | 1/2007 | Dewar | 425/564 |
| 2004/0137106 A1 | 7/2004 | Ciccone | |

FOREIGN PATENT DOCUMENTS

| | | | |
|---|---|---|---|
| JP | 2-225018 | * | 7/1990 |
| WO | WO03028974 A | | 4/2003 |

OTHER PUBLICATIONS

PCT Search Report and Written Opinion of International Searching Authority mailed Dec. 9, 2006.

* cited by examiner

*Primary Examiner*—Tim Heitbrink
(74) *Attorney, Agent, or Firm*—John W. Gregg

(57) ABSTRACT

An apparatus for injection molding wherein melt is conveyed to a gate in fluid communication with at least one mold cavity comprises a nozzle for conveying melt, the nozzle having an inlet for admitting melt, at least one outlet for directing melt to mold cavities and received within a recess of the gate, a nozzle body having a passage therethrough for conveying melt from the inlet to the outlet, and at least one split ring seal received in a groove in the exterior of the nozzle body so as to be displaceable relative to the associated groove, the split ring seal having an outside perimeter for contacting the surface of the recess of a gate, the split ring seals maintaining separation of the periphery of the nozzle body from the surface of the recess with the outlet positioned within the recess. Each split ring seal advantageously comprises overlapping end segments abuttingly engaged with the outlet positioned within the recess.

14 Claims, 3 Drawing Sheets

Fig. 3
Fig. 5
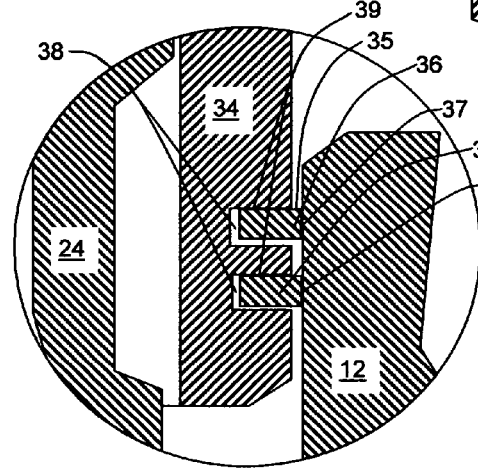
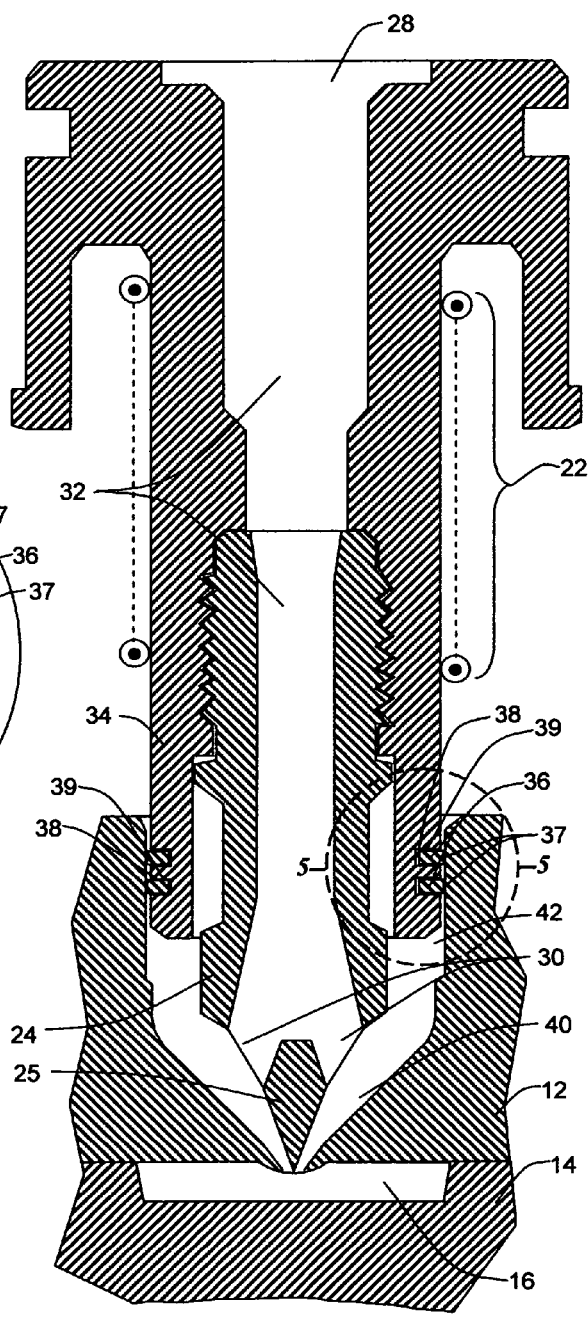

APPARATUS FOR INJECTION MOLDING

BACKGROUND OF THE INVENTION

1. Field of the Invention

This invention relates generally to injection molding and particularly to nozzles used to convey melt from a plasticizing unit to cavities of a mold assembly. More particularly, the present invention relates to seals for preventing pressurized melt from escaping past a nozzle fitted in a mold assembly.

2. Description of Related Art

Injection molding is a cyclic process wherein material to be molded is converted to a flowable mass (so-called "melt"), a predetermined quantity of melt is propelled into mold cavities and allowed to solidify and the resulting articles are removed from the mold cavities. Mold cavities are formed by mating mold components of mold assemblies, the mating mold components being brought into engagement for mold filling and curing, and separated for removal of molded articles. The mold assemblies are mounted in a clamp unit comprising movable members carrying the mold components and elements for producing the forces required to hold the mating mold components in mating engagement during mold filling. Raw material to be molded is converted from pellet and/or powder form to melt by an injection unit where the raw material is heated and mechanically worked. The injection unit accumulates the predetermined quantity of melt and propels the melt into the mold cavities by application of force to the melt. Melt is conveyed through conduits comprising the mold assembly to the mold cavities. Melt enters the mold cavities through one or more small openings (so-called "gates"). It is known to provide a nozzle for each gate to increase the velocity and dispersion of melt entering the mold cavities, the nozzles reducing the cross-section through which melt passes between the conduits and the gates.

It is known to provide nozzle sealing members for creating a seal between a nozzle and the member of a mold assembly receiving the outlet end of the nozzle so as to prevent pressurized melt from bypassing the nozzle and leaking from the mold assembly. Known seals are located proximate the outlet end of the nozzle and comprise extensions of the nozzle body or nozzle tip. Thermal expansion and/or deformation from forces transmitted through the melt maintain proximity and/or contact of sealing members with surfaces of the mold member to seal against leakage of melt past the sealing members. To reduce heat transfer between heated nozzles and mold members, it is known to provide gap sealing means wherein a gap established between a gap sealing surface associated with the nozzle and a gap sealing surface associated with the mold member is effective to inhibit flow of melt through the gap. In the known seal arrangements, the sealing members are either fixed to the nozzle mechanically or by press fit relying on elasticity of the sealing member to maintain adequate retention forces.

SUMMARY OF THE INVENTION

It is an object of the present invention to provide an apparatus for injection molding comprising a nozzle for conveying melt, the nozzle having at least one split ring seal received in a groove in the exterior of the nozzle body, each split ring seal being displaceable relative to the associated groove, the split ring seals maintaining separation of the periphery of the nozzle body from the surface of the recess of a gate passing melt from the nozzle to a mold cavity.

It is a further object of the present invention to provide an apparatus for injection molding comprising a mold assembly defining at least one mold cavity and having at least one gate in fluid communication with at least one mold cavity, at least one nozzle for conveying melt through a gate, the nozzle having at least one split ring seal received in a groove in the exterior of the nozzle body so as to be displaceable relative to the groove, the split ring seals maintaining separation of the periphery of the nozzle body from the surface of a gate recess.

Further objects and advantages of the invention shall be made apparent from the accompanying drawings and the following description thereof.

In accordance with the aforesaid objects the present invention provides an apparatus for injection molding wherein melt is conveyed to at least one cavity of a mold assembly, the mold assembly comprising at least one gate for receiving melt and each gate being in fluid communication with at least one mold cavity and comprising a recess wherein melt is received, the apparatus comprising a nozzle for conveying melt, the nozzle having an inlet for admitting melt, at least one outlet for directing melt to mold cavities, a nozzle body having a passage therethrough for conveying melt from the inlet to the outlet, and at least one split ring seal received in a groove in the exterior of the nozzle body so as to be displaceable relative to the associated groove, each split ring seal having an outside perimeter for contacting the surface of the recess of a gate, the split ring seals maintaining separation of the periphery of the nozzle body from the recess surface with the outlet positioned within the recess. A mold assembly defining at least one mold cavity and having at least one gate comprising a recess for receiving melt, each gate being in fluid communication with at least one mold cavity, the mold assembly comprising a nozzle in accordance with the invention for at least one gate.

BRIEF DESCRIPTION OF THE DRAWINGS

FIG. 3 is a partial sectional view of a first embodiment of a nozzle in accordance with the invention.

FIG. 5 is an enlarged view of the portion 5-5 of the nozzle of FIG. 3

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1:
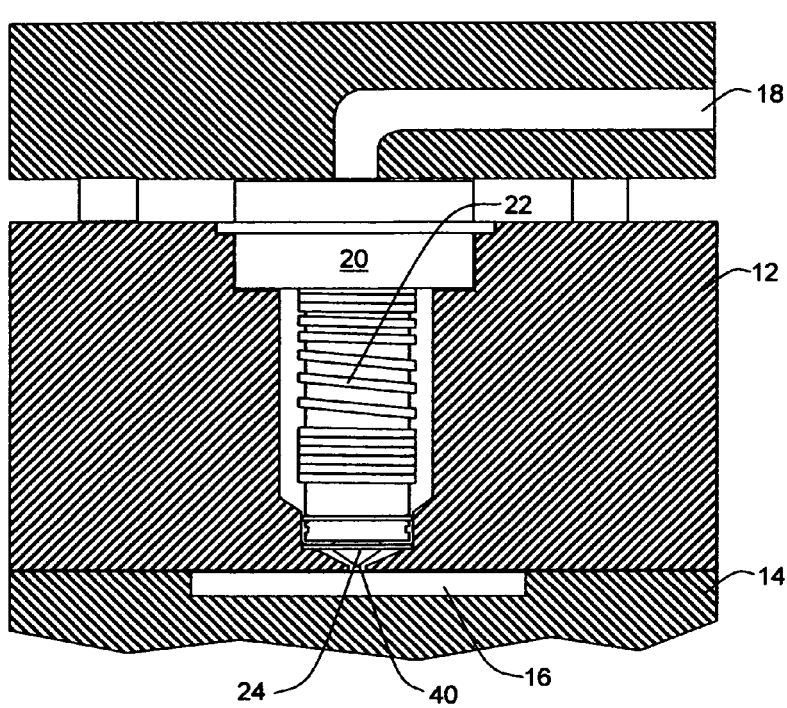
FIG. 1 is a partial sectional view of a portion of a mold assembly and nozzle.
Figure 2:
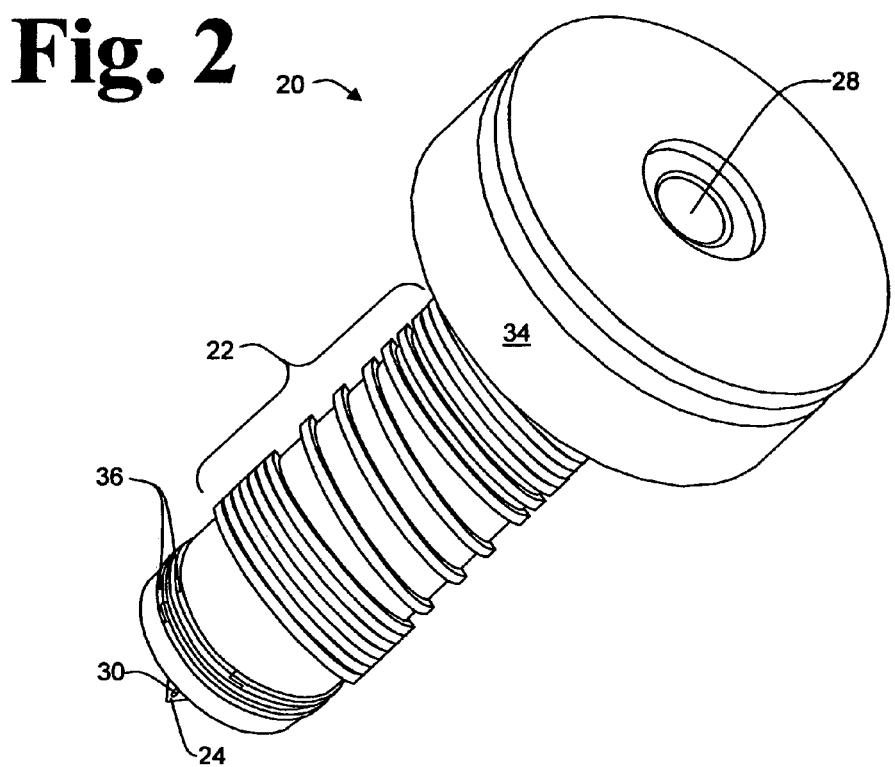
FIG. 2 is a three dimensional view of a nozzle in accordance with the invention.

Referring to FIG. 1, a mold assembly 10 comprises mating mold components 12 and 14 which when brought together in mating engagement create mold cavities such as cavity 16. A plasticizing unit (not shown) converts raw material to a flowable mass, so-called "melt" that is propelled by the injection unit to fill the mold cavities. Mold assembly 10 further comprises melt distributing means comprising conduits such as conduit 18 for conveying melt from the plasticizing unit to the mold cavities. Nozzles, such as nozzle 20 increase the dispersion and velocity of flow of melt exiting the nozzle to reduce the time required to fill mold cavities, thereby enhancing the complete filling thereof. Advantageously, nozzle 20 comprises one or more heaters such as coil heater 22 to transfer heat to melt resident in nozzle 20. Nozzle 20 advantageously comprises tip member 24 comprising an outlet for melt. Melt is admitted to mold cavity 16 through gate 40 comprising a recess 42 for receiving the outlet of nozzle 20.

Figure 4:
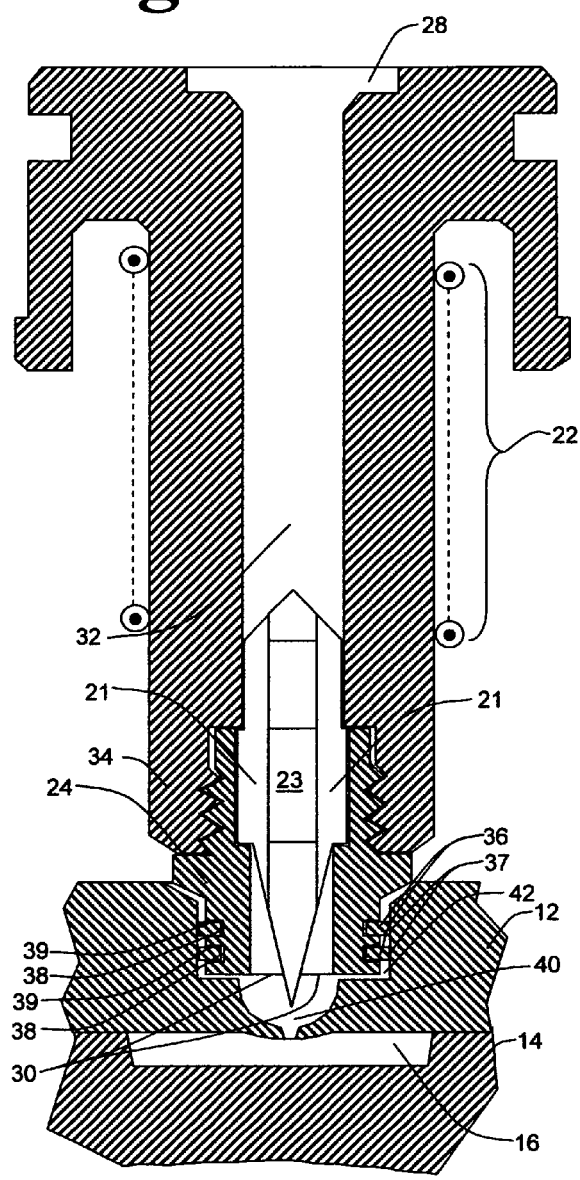
FIG. 4 is a partial sectional view of a second embodiment of a nozzle in accordance with the invention.
Figure 6:
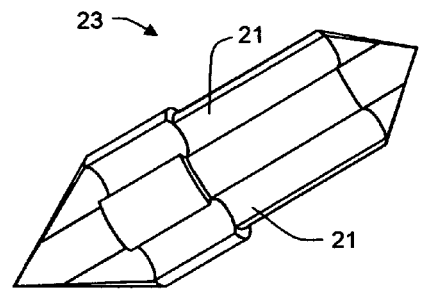
FIG. 6 is a three dimensional view of a point gate needle comprising the nozzle of FIG. 4.

Referring to FIGS. 2, 3, 4, 5 and 6, nozzle 20 comprises cylindrical nozzle body 34 having a head end for mounting to a mold member and a tubular shank for projecting into a gate recess. An inlet 28 for admitting melt is open at the head end, and an outlet 30 for directing melt to a gate is open at the exposed end of the tubular shank. Passage 32 in nozzle body 34 joins inlet 28 and outlet 30. Nozzle body 34 comprises nozzle tip member 24 attached by, for example, threaded engagement. Passage 32 extends through nozzle tip member 24 to outlet 30. In the embodiment of FIG. 3, nozzle tip member 24 comprises a diverter 25 dividing the flow of melt into two or more streams prior to exit at outlet 30. In the embodiment of FIG. 4, nozzle tip member 24 retains point gate needle 23 within passage 32. Point gate needle 23, has two or more longitudinal grooves 21 open at the periphery of point gate needle 23 and extending from the end thereof projecting into passage 32 to the end thereof terminating at outlet 30. Grooves 21 and passage 32 define two or more passages 21 for dividing melt into two or more streams prior to exit through outlet 30.

To seal against melt bypassing nozzle 20 at recess 42, sealing members are interposed between nozzle 20 and the surface of recess 42. In accordance with the invention, split ring seals 36 are received within grooves 38 in the exterior of nozzle 20 proximate outlet 30. In the embodiment of FIG. 3, grooves 38 are in the exterior of nozzle body 34; in the embodiment of FIG. 4, grooves 38 are in the exterior of tip member 24. Perimeter 37 of each split ring seal 36 contacts recess 42 at a cylindrical portion thereof. Split ring seals 36 and grooves 38 are sized so as to maintain separation between nozzle body 34 and recess 42 with outlet 30 positioned within recess 42. Grooves 38 provide sufficient clearance so that each split ring seal 36 is displaceable relative to associated groove 38 while maintaining separation of nozzle body 34 and the surface of recess 42. Each of Split ring seals 36 are displaceable relative to the associated groove 38 both axially (substantially in parallel with passage 32) and transversely (substantially perpendicularly to passage 32). Melt filling recess 42 drives split ring seals 36 axially relative to grooves 38 so that the top surface 35 (FIG. 5) of each split ring seal 36 abuts top wall 39 of the associated groove 38. As nozzle body 34 and recess 42 undergo dimensional changes caused by changes of temperature, each split ring seal 36 is displaced relative to associated groove 38 so as to maintain contact of at least a portion of perimeter 37 with the surface of recess 42 and to maintain contact of top surface 35 with top wall 39 of associated groove 38.

Solidification of melt in mold cavity 16 requires reduction of the temperature thereof. To this end, heat is transferred from the melt to mold components 12 and 14, which are advantageously equipped with heat transfer means to remove heat therefrom. Heat is required to maintain melt resident in nozzle 20 in a flowable condition. Transfer of heat from nozzle 20 to mold component 12 increases the demand for supplemental heat supplied by heaters such as heater 22. Separation of nozzle body 34 from surfaces of recess 42 inhibits heat transfer between nozzle 20 and mold component 12, reducing the need for supplemental heat from heater 22. Further, the interposition of each of split ring seals 36 between nozzle body 34 and recess 42 adds two surface boundaries for heat transfer between nozzle 20 and mold component 12, further increasing resistance to heat transfer there between. Advantageously, split ring seals 36 are made from a material which is a poor conductor of heat and having a low coefficient of thermal expansion whereby dimensional stability of split ring seals 36 is maintained while heat transfer through split ring seals 36 is attenuated.

Figure 7:
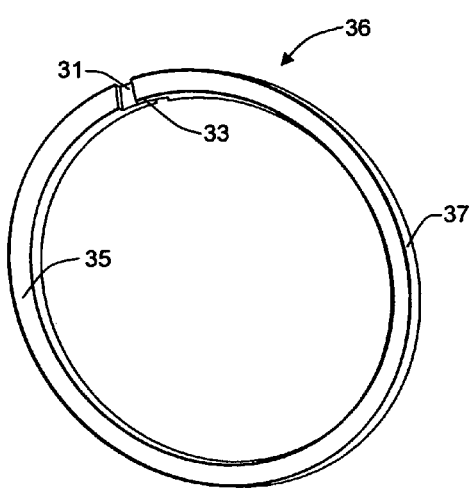
FIG. 7 is a three dimensional view of a split ring sealing member.

Referring to FIG. 7, split ring seal 36 comprises overlapping end segments 31 and 33. With each split ring seal 36 in position in each groove 38 and nozzle outlet 30 in position in recess 42, overlapping segments 31 and 33 are engaged so as to abut over a portion of the facing surfaces thereof. Split ring seal 36 is sufficiently resilient so that perimeter 37 can expand or contract with changes of diameter of recess 42 with temperature, such expansion and contraction altering the extent of overlap of end segments 31 and 33. It will be understood that the expansion and contraction of perimeter 37 can distort nominal circularity of a split ring seal 36. Advantageously, plural split ring seals 36 are applied to nozzle 20 to accommodate distortion of each while maintaining the desired seal. In such arrangements, it is advantageous to orient the split ring seals 36 relative to each other so that the overlapping end segments of each split ring seal are displaced angularly relative to the overlapping end segments of each of the other split ring seals (see FIG. 2). Such relative orientations are effective to distribute distortions of circularity of split ring seals 36 around the circumference of nozzle 20 whereby the desired overall seal with surfaces of recess 42 is maintained.

What is claimed is:

1. An apparatus for injection molding wherein melt is conveyed to at least one cavity of a mold assembly, the mold assembly comprising at least one gate for receiving melt and each gate being in fluid communication with at least one mold cavity and comprising a recess wherein melt is received, the apparatus comprising a nozzle for conveying melt, the nozzle having an inlet for admitting melt, at least one outlet for directing melt to mold cavities, a nozzle body having a passage therethrough for conveying melt from the inlet to the outlet, and at least one split ring seal received in a groove in the exterior of the nozzle body, each split ring seal being displaceable relative to the associated groove, each split ring seal comprising end segments and an outside perimeter, and each split ring seal being sufficiently resilient to allow the outside perimeter to expand and contract to maintain contact of the split ring seal with the surface of the recess of a gate in which the outlet is received, the split ring seals maintaining separation of the periphery of the nozzle body from the recess surface.

2. The apparatus according to claim 1 wherein the end segments of each split ring seal overlap, the overlapping portions thereof abutting one another with the outlet positioned within the recess.

3. The apparatus according to claim 2 wherein the nozzle further comprises a plurality of split ring seals, each split ring seal oriented relative to the other split ring seals so that overlapping end segments of each split ring seal are displaced angularly from the overlapping end segments of each of the other split ring seals.

4. The apparatus according to claim 1 wherein the nozzle body further comprises a tip member attached to the nozzle body and comprising the outlet and each split ring seal is received within a groove in the exterior of the tip member.

5. The apparatus according to claim 4 wherein the tip member retains a point gate needle within the nozzle body, the point gate needle having a plurality of longitudinal grooves open to the needle periphery and joining an end projecting into the passage with an end terminating at the outlet, the point gate needle effective to divide melt into plural streams prior to exiting through the outlet.

6. The apparatus according to claim 1 wherein the nozzle further comprises at least one heater for maintaining melt within the passage in a flowable condition.

7. The apparatus according to claim 1 wherein the nozzle further comprises a diverter within the passage for dividing melt passing therethrough.

8. A mold assembly defining at least one mold cavity and having at least one gate comprising a recess for receiving melt, each gate being in fluid communication with at least one mold cavity, comprises at least one nozzle for conveying melt, the nozzle having an inlet for admitting melt, at least one outlet for directing melt to mold cavities, a nozzle body having a passage therethrough for conveying melt from the inlet to the outlet, and at least one split ring seal received in a groove in the exterior of the nozzle body so as to be displaceable relative to the groove, each split ring seal comprising end segments and an outside perimeter, and each split ring seal being sufficiently resilient to allow the outside perimeter to expand and contract to maintain contact of the Split ring seal with the surface of the recess of a gate in which the outlet is received, the split ring seals maintaining separation of the periphery of the nozzle body from the recess surface.

9. The mold assembly according to claim 8 wherein the end segments of the split ring seal overlap, the overlapping portions thereof abutting one another with the outlet positioned within the recess.

10. The mold assembly according to claim 9 wherein the nozzle further comprises a plurality of split ring seals, each split ring seal oriented relative to the other split ring seals so that overlapping end segments of each split ring seal are displaced angularly from the overlapping end segments of each of the other split ring seals.

11. The mold assembly according to claim 8 wherein the nozzle body further comprises a tip member attached to the nozzle body and comprising the outlet and the split ring seal is received within a groove in the exterior of the tip member.

12. The mold assembly according to claim 11 wherein the tip member retains a point gate needle within the nozzle body, the point gate needle having a plurality of longitudinal grooves open to the needle periphery and joining an end projecting into the passage with an end terminating at the outlet, the point gate needle effective to divide melt into plural streams prior to exiting through the outlet.

13. The mold assembly according to claim 8 wherein the nozzle further comprises at least one heater for maintaining melt within the passage in a flowable condition.

14. The mold assembly according to claim 8 wherein the nozzle further comprises a diverter within the passage for dividing melt passing therethrough.

* * * * *